US008388309B2

(12) United States Patent
Marra et al.

(10) Patent No.: US 8,388,309 B2
(45) Date of Patent: Mar. 5, 2013

(54) GAS TURBINE SEALING APPARATUS

(75) Inventors: John Joseph Marra, Winter Springs, FL (US); Brian J. Wessell, Orlando, FL (US); George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 691 days.

(21) Appl. No.: 12/611,257

(22) Filed: Nov. 3, 2009

(65) Prior Publication Data

US 2010/0074732 A1 Mar. 25, 2010

Related U.S. Application Data

(63) Continuation-in-part of application No. 12/355,878, filed on Jan. 19, 2009, now Pat. No. 8,162,598.

(60) Provisional application No. 61/100,107, filed on Sep. 25, 2008.

(51) Int. Cl.
*F02C 7/28* (2006.01)

(52) U.S. Cl. ............... 415/171.1; 415/173.7; 415/174.4; 415/174.5; 415/191

(58) Field of Classification Search ............... 415/170.1, 415/171.1, 173.7, 174.4, 174.5, 191
See application file for complete search history.

(56) References Cited

U.S. PATENT DOCUMENTS 3,056,579 A * 10/1962 Bobo .......................... 416/96 R
3,647,311 A 3/1972 Wootton et al.
4,035,102 A * 7/1977 Maghon .......................... 416/95
4,432,697 A * 2/1984 Miura et al. .............. 416/198 A
4,820,116 A * 4/1989 Hovan et al. .................. 415/115
4,884,950 A * 12/1989 Brodell et al. ................ 416/174
5,813,827 A 9/1998 Nordlund et al.
5,833,244 A * 11/1998 Salt et al. ...................... 277/421
6,152,685 A 11/2000 Hagi
6,152,690 A 11/2000 Tomita et al.
6,217,279 B1 4/2001 Ai et al.
6,558,114 B1 5/2003 Tapley et al.
6,655,920 B2 * 12/2003 Beutin et al. .............. 416/198 A
7,201,564 B2 4/2007 Bolms et al.
7,234,918 B2 6/2007 Brillert et al.

OTHER PUBLICATIONS

U.S. Appl. No. 12/022,302, filed Jan. 30, 2008 entitled Turbine Disc Sealing Assembly.

* cited by examiner

*Primary Examiner* — Igor Kershteyn

(57) ABSTRACT

A sealing apparatus in a gas turbine. The sealing apparatus includes a seal housing apparatus coupled to a disc/rotor assembly so as to be rotatable therewith during operation of the gas turbine. The seal housing apparatus comprises a base member, a first leg portion, a second leg portion, and spanning structure. The base member extends generally axially between forward and aft rows of rotatable blades and is positioned adjacent to a row of stationary vanes. The first leg portion extends radially inwardly from the base member and is coupled to the disc/rotor assembly. The second leg portion is axially spaced from the first leg portion, extends radially inwardly from the base member, and is coupled to the disc/rotor assembly. The spanning structure extends between and is rigidly coupled to each of the base member, the first leg portion, and the second leg portion.

20 Claims, 9 Drawing Sheets

GAS TURBINE SEALING APPARATUS

CROSS-REFERENCE TO RELATED APPLICATION

This application is a continuation-in-part of U.S. application Ser. No. 12/355,878, entitled GAS TURBINE SEALING APPARATUS, filed Jan. 19, 2009 now U.S. Pat. No. 8,162,598, by George Liang, which claims the benefit of U.S. Provisional Application Ser. No. 61/100,107, entitled TURBINE RIM CAVITY SEALING CONSTRUCTION TECHNIQUE, filed Sep. 25, 2008, by George Liang, the entire disclosures of which are incorporated by reference herein.

This invention was made with U.S. Government support under Contract Number DE-FC26-05NT42644 awarded by the U.S. Department of Energy. The U.S. Government has certain rights to this invention.

FIELD OF THE INVENTION

The present invention relates generally to a sealing apparatus for use in a gas turbine engine.

BACKGROUND OF THE INVENTION

In multistage rotary machines used for energy conversion, for example, a fluid is used to produce rotational motion. In a gas turbine engine, for example, a gas is compressed in a compressor and mixed with a fuel in a combustor. The combination of gas and fuel is then ignited for generating hot combustion gases that are directed to turbine stage(s) to produce rotational motion. Both the turbine stage(s) and the compressor have stationary or non-rotary components, such as vanes, for example, that cooperate with rotatable components, such as rotor blades, for example, for compressing and expanding the working gases. Many components within the machines must be cooled by cooling fluid to prevent the components from overheating.

Leakage between hot gas in a hot gas flow path and cooling fluid (air) within cavities in the machines, i.e., rim or vane cavities, reduces engine performance and efficiency. Cooling air leakage from the cavities into the hot gas flow path can disrupt the flow of the hot gases and increase heat losses. Further, the more cooling air that is leaked into the hot gas flow path, the higher the primary zone temperature in the combustor must be to achieve the required engine firing temperature. Additionally, hot gas leakage into the rim/vane cavities yields higher vane and vane platform temperatures and may result in reduced performance.

SUMMARY OF THE INVENTION

In accordance with one aspect of the present invention, a sealing apparatus is provided in a gas turbine comprising forward and aft rows of rotatable blades coupled to a disc/rotor assembly and a row of stationary vanes positioned between the forward and aft rows of rotatable blades. The sealing apparatus comprises a seal housing apparatus coupled to the disc/rotor assembly so as to be rotatable with the disc/rotor assembly during operation of the gas turbine. The seal housing apparatus comprises a base member, a first leg portion, a second leg portion, and spanning structure. The base member extends generally axially between the forward and aft rows of rotatable blades and is positioned adjacent to the row of stationary vanes. The first leg portion extends radially inwardly from the base member and is coupled to the disc/rotor assembly. The second leg portion is axially spaced from the first leg portion, extends radially inwardly from the base member, and is coupled to the disc/rotor assembly. The spanning structure extends between and is rigidly coupled to each of the base member, the first leg portion, and the second leg portion.

In accordance with a second aspect of the present invention, a gas turbine is provided. The gas turbine comprises forward and aft rows of rotatable blades coupled to a disc/rotor assembly, a row of stationary vanes positioned between the forward and aft rows of rotatable blades, each of the vanes comprising an inner diameter platform having first sealing structure, and rotatable sealing apparatus. The rotatable sealing apparatus comprises a seal housing apparatus coupled to the disc/rotor assembly. The seal housing apparatus comprises a base member, a first leg portion, a second leg portion, and spanning structure. The base member extends generally axially between the forward and aft rows of rotatable blades and is positioned adjacent to the row of stationary vanes. The base member has second sealing structure adapted to cooperate with the first sealing structure to prevent leakage through a gap between the row of stationary vanes and the rotatable sealing apparatus. The first leg portion extends radially inwardly from the base member and is coupled to the disc/rotor assembly. The second leg portion is axially spaced from the first leg portion, extends radially inwardly from the base member, and is coupled to the disc/rotor assembly. The spanning structure extends between and is coupled to each of the base member, the first leg portion, and the second leg portion.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
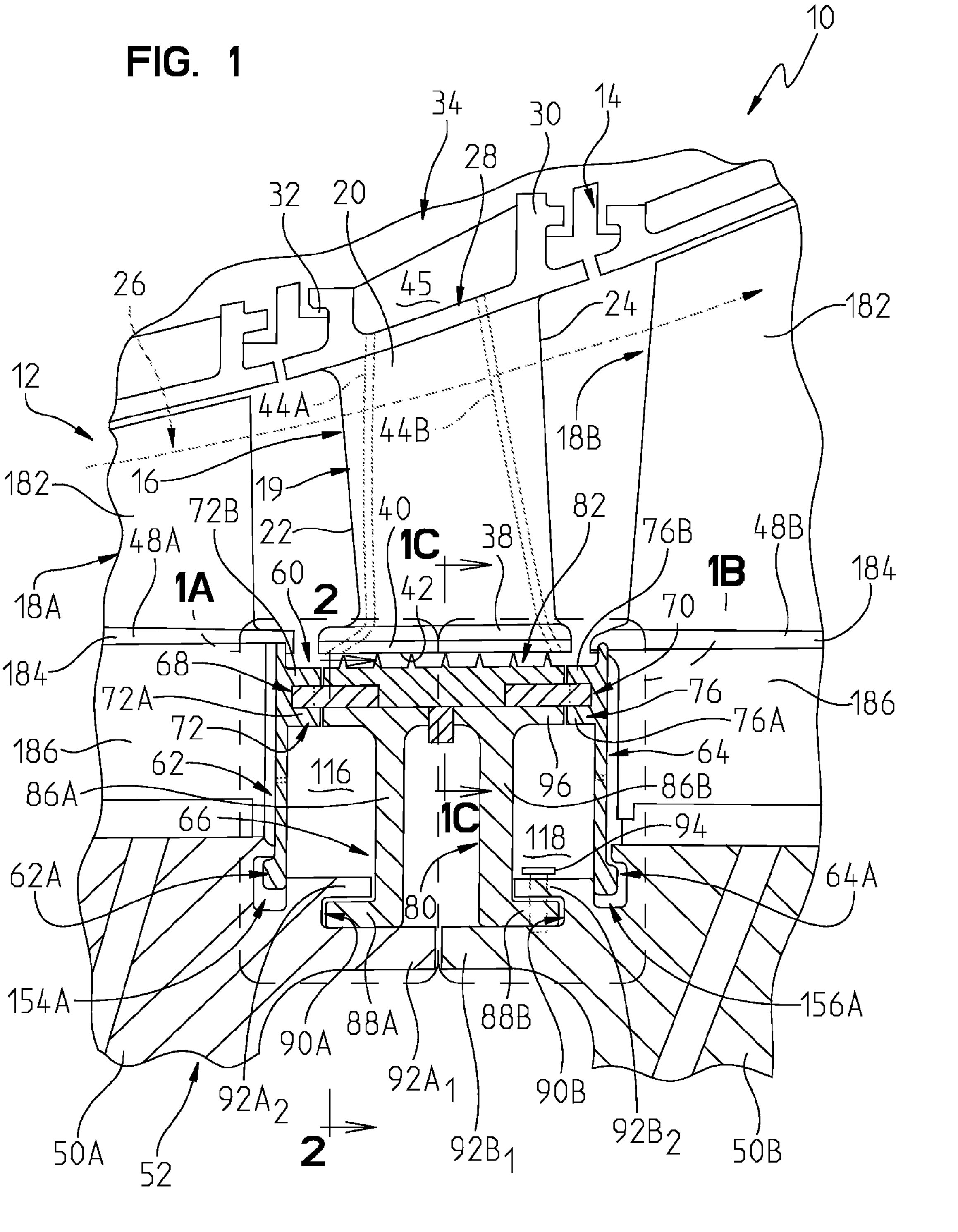
FIG. 1 is a diagrammatic sectional view of a portion of a gas turbine engine including a cavity seal assembly in accordance with the invention.

Referring to FIG. 1, a portion of a turbine section comprising adjoining stages 12, 14 of a gas turbine engine 10 is illustrated. Each stage 12, 14 comprises stationary components, illustrated herein as a row of vanes 16, and a row of rotatable blades, illustrated herein as a forward row of blades 18A, which correspond to the first stage 12, and an aft row of blades 18B, which correspond to the second stage 14.

Each row of vanes is defined by a plurality of circumferentially spaced-apart vanes 19. Each vane 19 comprises an airfoil 20, an outer diameter portion 28 coupled to the airfoil 20 and an inner diameter platform 38 coupled to the airfoil 20. Each airfoil 20 comprising a leading edge 22 and an axially spaced trailing edge 24. Gaps between the adjacent, circumferentially spaced-apart airfoils 20 define a portion of a hot gas flow path 26. The hot gas flow path 26 extends axially through the turbine section of the engine 10 and defines a passage along which hot combustion gases travel as they move through the turbine section of the engine 10.

The outer diameter portion 28 of each vane 19 comprises connecting structure 30. The connecting structure 30 mates with corresponding connecting structure 32 of a turbine casing 34 so as to connect the corresponding vane 19 to the turbine casing 34.

The inner diameter platform 38 in the embodiment shown in FIG. 1 has a substantially constant thickness in a radial direction throughout its entirety, i.e., in axial and circumferential directions. The inner diameter platform 38 comprises a first sealing structure 40 comprising an abrasive layer in the embodiment shown, but may comprise other structure, such as, for example, labyrinth teeth or honeycomb seal material. The abrasive layer may be formed, for example from a combination of yttria and zirconia, while the remaining portion of the inner diameter platform 38 may be formed, for example from a metal alloy. A conventional bonding material may be used to bond the abrasive layer to the remaining portion of the inner diameter platform 38. The first sealing structure 40 extends axially and circumferentially as part of the inner diameter platform 38 and defines a radially innermost surface 42 of the vane 19. In the embodiment shown in FIG. 1, the radially innermost surface 42 of the vane 19 has a curvature in a circumferential direction and is substantially linear in the axial direction so as to be substantially parallel to a central axis of the turbine section or horizontal.

As shown in FIG. 1, first and second bores 44A and 44B extend through the outer diameter portion 28 and the airfoil 20. The bores 44A, 44B are in communication with and receive cooling air from a cooling air pocket 45 located between the outer diameter portion 28 of the vane 19 and the connecting structure 32 of the of turbine casing 34. The bores 44A, 44B communicate with and deliver the cooling air from the cooling air pocket 45 into respective first and second cooling fluid passages 46A, 46B, see FIGS. 1A and 1B, formed in the inner diameter platform 38 including the abrasive layer defining the first sealing structure 40. The cooling air flows out of the first and second cooling fluid passages 46A, 46B to provide cooling as will be described below.

The forward and aft rows of blades 18A, 18B each comprise a plurality of circumferentially spaced-apart turbine blades. Each blade 18A, 18B may comprise an airfoil 182, a platform 184 and a root 186, wherein the airfoil 182, platform 184 and root 186 may be integrally formed together. The forward and aft rows of blades 18A, 18B are coupled to respective first and second rotor discs 50A, 50B of a disc/rotor assembly 52 via their roots 186. Gaps between adjacent circumferentially spaced-apart blades 18A, 18B define respective portions of the hot gas flow path 26.

Figure 1A:
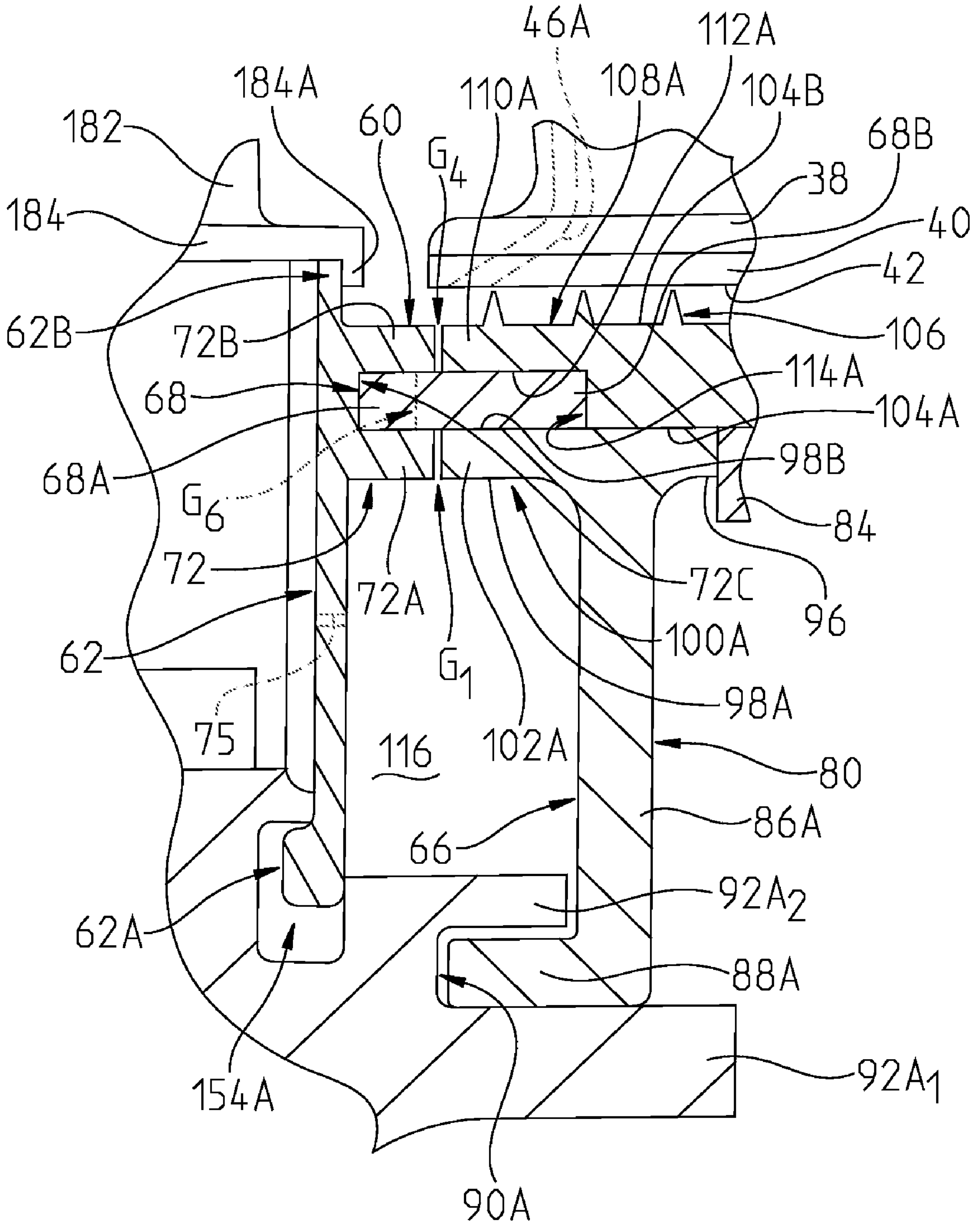
FIG. 1A is an enlarged sectional view of an area, as identified in FIG. 1, illustrating a portion of the cavity seal assembly.
Figure 1B:
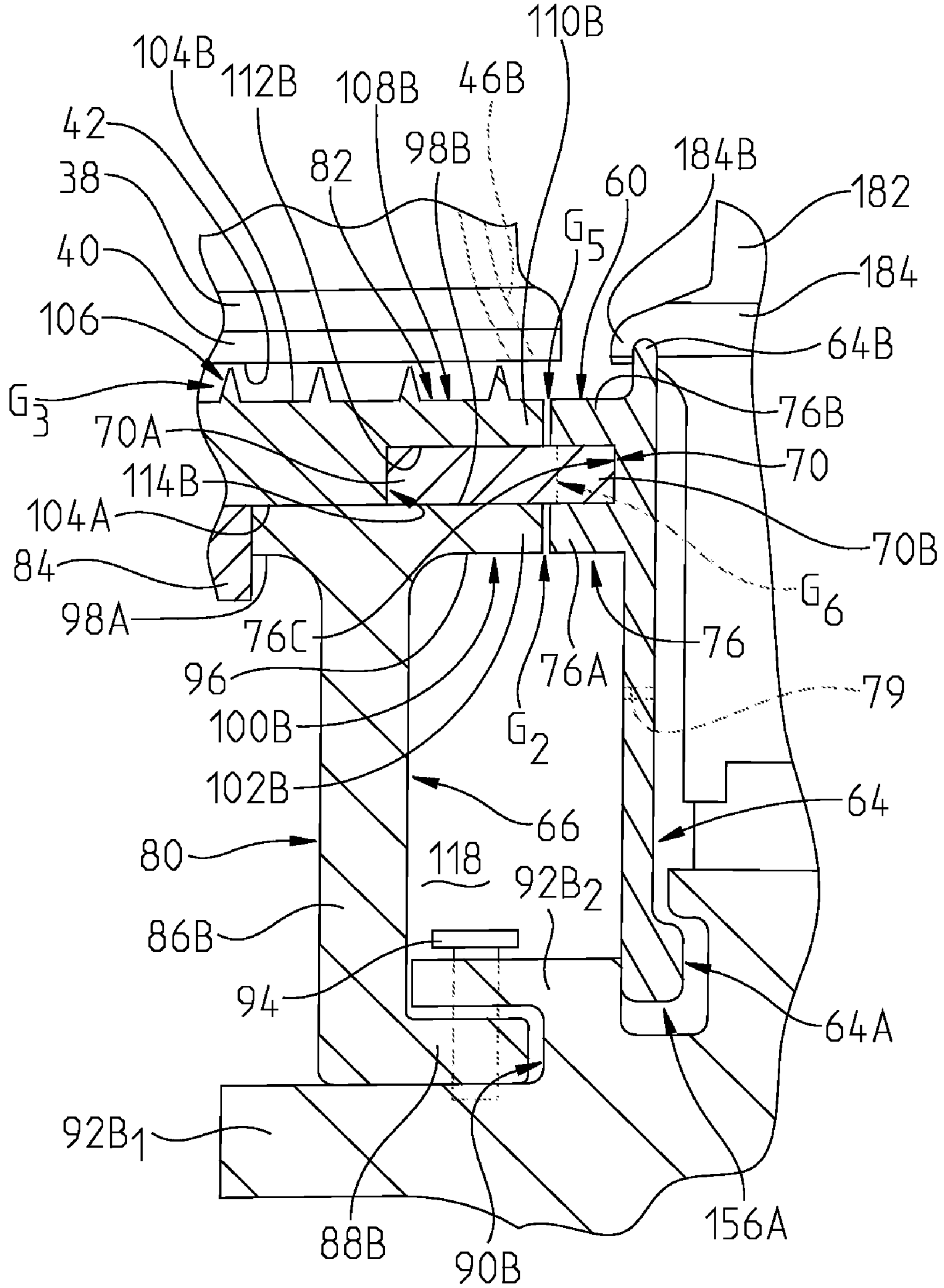
FIG. 1B is an enlarged sectional view of an area, as identified in FIG. 1, illustrating a portion of the cavity seal assembly.

Referring to FIGS. 1, 1A, and 1B, a sealing apparatus 60 according to an embodiment of the invention is shown. The sealing apparatus 60 is positioned between and rotates with the forward row of blades 18A and the aft rows of blades 18B. The sealing apparatus 60 comprises a first seal retainer plate structure 62, a second seal retainer plate structure 64, a seal housing apparatus 66, a first seal member 68, and a second seal member 70. It is noted that the sealing apparatus 60 extends circumferentially about the disc/rotor assembly 52. The sealing apparatus 60 may be formed in discrete circumferential sections, see FIG. 2, where first, second, third and fourth sections $S_1$, $S_2$, $S_3$, $S_4$ are illustrated. The discrete circumferential sections, when assembled about the disc/rotor assembly 52, define a corresponding sealing apparatus 60 that extends completely about the entire disc/rotor assembly 52. In a preferred embodiment, the sealing apparatus 60 may be formed in discrete sections comprising 22.5°, 45°, 90°, or 180° sections of the full sealing apparatus 60 (which is typically a 360° sealing apparatus 60), although other configurations may be used. Each discrete section of the sealing apparatus 60 comprises a corresponding first seal retainer plate structure section, second seal retainer plate structure section, seal housing apparatus section, first seal member section, and second seal member section.

Referring to FIGS. 1 and 1A, the first seal retainer plate structure 62 is associated with the forward row of blades 18A. The first seal retainer plate structure 62, which, as noted above, may comprise a plurality of discrete circumferentially extending sections, comprises a first L-shaped end 62A and a second end 62B, see FIG. 1A. The first L-shaped end 62A is received in a first recess 154A defined in the first rotor disc 50A of the disc/rotor assembly 52. The second end 62B is engaged and held in position by L-shaped end portions 184A of the platforms 184 of the blades 18A, see FIG. 1A. The first seal retainer plate structure 62 rotates with the blades 18A and the first rotor disc 50A.

The first seal retainer plate structure 62 in the embodiment shown further comprises first axially extending seal structure 72 comprising first and second axially extending legs 72A and 72B, which define a first recess 72C therebetween, see FIG. 1A. One or a plurality of cooling fluid apertures 75, see FIG. 1A, may be formed in the first seal retainer plate structure 62 for permitting a cooling fluid to flow therethrough as will be described below.

Referring to FIGS. 1 and 1B, the second seal retainer plate structure 64 is associated with the aft row of blades 18B. The second plate structure 64, which, as noted above, may comprise a plurality of discrete circumferentially extending sections, comprises a third L-shaped end 64A and a fourth end 64B, see FIG. 1B. The third L-shaped end 64A is received in a second recess 156A defined in the second rotor disc 50B of the disc/rotor assembly 52. The fourth end 64B is engaged and held in position by end portions 184B of the platforms 184 of the aft blades 18B, see FIG. 1B. The second seal retainer plate structure 64 rotates with the blades 18B and the second rotor disc 50B.

The second seal retainer plate structure 64 in the embodiment shown further comprises second axially extending seal structure 76 comprising first and second axially extending legs 76A and 76B, which define a second recess 76C therebetween, see FIG. 1B. One or a plurality of cooling fluid apertures 79, see FIG. 1B, may be formed in the second seal retainer plate structure 64 for permitting a cooling fluid to flow therethrough as will be described below.

The seal housing apparatus 66 comprises a radially inner seal housing structure 80 and a radially outer seal housing structure 82 coupled together, although it is understood that the radially inner and outer seal housing structures 80, 82 may comprise a single seal housing structure. The radially outer seal housing structure 82 comprises one or more circumferentially spaced apart L-shaped connection structures 84 for coupling the outer seal housing structure 82 to the inner seal housing structure 80, see FIG. 1C, such that, during operation of the engine 10, the radially inner and outer seal housing structures 80, 82 are rotatable together in a direction of operation of the disc/rotor assembly 52 (into the page as shown in FIGS. 1, 1A, and 1B) but are able to be rotated with respect to each other in a direct opposite to that of the direction of operation of the disc/rotor assembly 52 (out of the page as shown in FIGS. 1, 1A, and 1B).

Figure 1C:
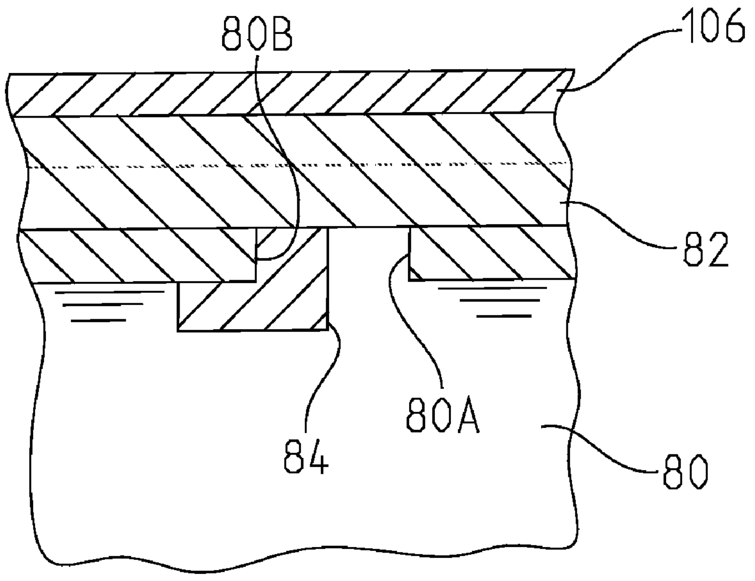
FIG. 1C is an enlarged cross sectional view of a portion of the cavity seal assembly taken along line 1C-1C in FIG. 1.

Each connection structure 84 in the embodiment shown is affixed to or integrally formed with the outer seal housing structure 82 and is inserted into a corresponding circumferentially enlarged aperture 80A, see FIG. 1C, formed in the inner seal housing structure 82. The inner and outer seal housing structures 80, 82 are then rotated circumferentially in opposite directions with respect to each other until the connection structure 84 abuts a radially extending surface 80B of the inner seal housing structure 80, as shown in FIG. 1C. The connection structure 84 allows the radially inner and outer seal housing structures 80, 82 to be assembled and disassembled more efficiently, i.e. in the case that the radially outer seal housing structure 82 must be repaired or replaced.

Figure 2:
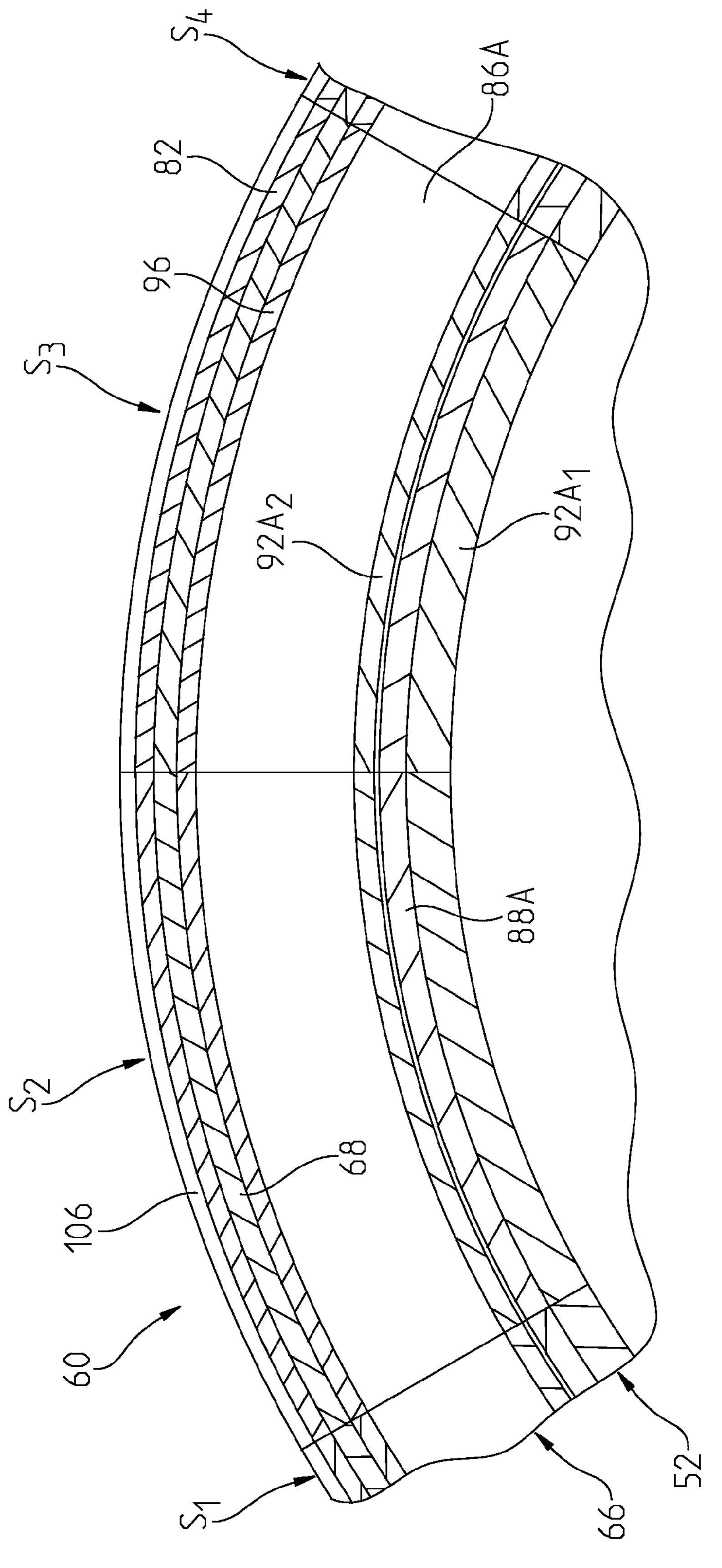
FIG. 2 is a cross sectional view of a portion of the cavity seal assembly taken along line 2-2 in FIG. 1.

The radially inner seal housing structure 80, which may comprise a plurality of discrete circumferential sections, extends circumferentially about the disc/rotor assembly 52 as most clearly shown in FIG. 2. The radially inner seal housing structure 80 comprises first and second axially spaced apart and generally radially extending leg portions 86A, 86B (see FIGS. 1, 1A, and 1B), which leg portions 86A, 86B each include a respective generally axially extending L-shaped foot portion 88A, 88B. Each foot portion 88A, 88B may be integrally formed with a corresponding remaining section of its respective leg portion 86A, 86B.

The foot portions 88A, 88B are received in slots 90A, 90B formed in respective ones of the rotor discs 50A, 50B of the disc/rotor assembly 52. The slots 90A, 90B are defined by pairs of axially extending members 92$A_1$, 92$A_2$ and 92$B_1$, 92$B_2$ of the respective rotor discs 50A, 50B. Optionally, one or more retaining structures, illustrated in FIGS. 1 and 1B as an anti-rotation pin 94, are associated with one or both of the foot portions 88A, 88B (one anti-rotation pin 94 associated with the second foot portion 88B is shown in FIGS. 1 and 1B) and the axially extending members 92$A_1$, 92$A_2$ and 92$B_1$, 92$B_2$ of the respective rotor disc 50A, 50B. The anti-rotation pin 94 substantially prevents relative rotation between the disc/rotor assembly 52 and the seal housing apparatus 66.

The radially inner seal housing structure 80 also includes a plate-like member 96 that comprises a radially inner surface 98A and an opposed radially outer surface 98B, see FIGS. 1A and 1B. The radially inner surface 98A may be integrally formed with the first and second leg portions 86A, 86B. The radially outer surface 98B has a curvature in a circumferential direction and defines a substantially flat surface in the axial direction which engages the radially outer seal housing structure 82 of the seal housing apparatus 66.

As shown in FIG. 1A, an axial forward end portion 100A of the plate-like member 96 defines a forward inner seal member 102A. The forward inner seal member 102A extends in the axial direction to a location proximate the first axially extending leg 72A of the first seal structure 72. A first gap $G_1$ is formed between the forward inner seal member 102A and the first axially extending leg 72A. As shown in FIG. 1B, an axial aft end portion 100B of the plate-like member 96 defines an aft inner seal member 102B. The aft inner seal member 102B extends in the axial direction to a location proximate the first axially extending leg 76A of the second seal structure 76. A second gap $G_2$ is formed between the aft inner seal member 102B and the first axially extending leg 76A.

The radially outer seal housing structure 82 of the seal housing apparatus 66 comprises a radially inner surface 104A and an opposed radially outer surface 104B, as shown in FIGS. 1A and 1B. The radially inner surface 104A abuts the radially outer surface 98B of the radially inner seal housing structure 80 of the seal housing apparatus 66. The radially outer surface 104B has a curvature in a circumferential direction and includes associated second sealing structure comprising a plurality of seal teeth 106 in the illustrated embodiment.

The seal teeth 106 extend radially outwardly from the radially outer surface 1048 of the outer seal housing structure 82 and come into close proximity or engage with the first sealing structure 40 defining the radially innermost surface 42 of each vane 19, as shown in FIGS. 1, 1A and 1B. The seal teeth 106 and the first sealing structure 40 provide a reduced radial clearance between the rotatable seal housing apparatus 66 and each stationary vane 19 for limiting gas flow through a third gap $G_3$ formed between the seal housing apparatus 66 and each vane 19, see FIG. 1B.

As shown in FIG. 1A, the radially outer seal housing structure 82 comprises an axial forward end portion 108A that defines a forward outer seal member 110A. The forward outer seal member 110A extends in the axial direction to a location proximate the second axially extending leg 72B of the first axially extending seal structure 72 of the first seal retainer plate structure 62. A fourth gap $G_4$ is formed between the forward outer seal member 110A and the second axially extending leg 72B of the first axially extending seal structure 72.

The forward inner seal member 102A of the radially inner seal housing structure 80 and the forward outer seal member 110A of the radially outer seal housing structure 82 define a third recess 114A therebetween, see FIG. 1A.

As shown in FIG. 1B, the radially outer seal housing structure 82 further comprises an axial aft end portion 108B that defines an aft outer seal member 110B. The aft outer seal member 110B extends in the axial direction to a location proximate the second axially extending leg 76B of the second axially extending seal structure 76 of the second seal retainer plate structure 64. A fifth gap $G_5$ is formed between the aft outer seal member 110B and the second axially extending leg 76B of the second axially extending seal structure 76.

The aft inner seal member 102B of the radially inner seal housing structure 80 and the aft outer seal member 110B of the radially outer seal housing structure 82 define a fourth recess 114B therebetween, see FIG. 1B.

As shown in FIG. 1A, an axially forward end portion 68A of the first seal member 68 is received in the first recess 72C between the first and second axially extending legs 72A, 72B of the first axially extending seal structure 72 of the first seal retainer plate structure 62. An axially aft end portion 68B of the first seal member 68 is received in the third recess 114A defined by the forward inner seal member 102A of the radially inner seal housing structure 80 and the forward outer seal member 110A of the radially outer seal housing structure 82. The first seal member 68 is held in place between the first seal retainer plate structure 62 and the seal housing apparatus 66 and seals the gaps $G_1$ and $G_4$ formed between the first seal retainer plate structure 62 and the seal housing apparatus 66. The seal member 68 may comprise a plurality of discrete seal member sections positioned adjacent to one another in a circumferential direction.

As shown in FIG. 1B, an axially forward end portion 70A of the second seal member 70 is received in the fourth recess 114B defined by the aft inner seal member 102B of the radially inner seal housing structure 80 and the aft outer seal member 110B of the radially outer seal housing structure 82. An axially aft end portion 70B of the second seal member 70 is received in the second recess 76C defined between the first and second axially extending legs 76A, 76B of the second axially extending seal structure 76 of the second seal retainer plate structure 64. The second seal member 70 is held in place between the seal housing apparatus 66 and the second seal retainer plate structure 64 and seals the gaps $G_2$ and $G_5$ formed between the second seal retainer plate structure 64 and the seal housing apparatus 66. The seal member 70 may comprise a plurality of discrete seal member sections positioned adjacent to one another in a circumferential direction.

Figure 1D:
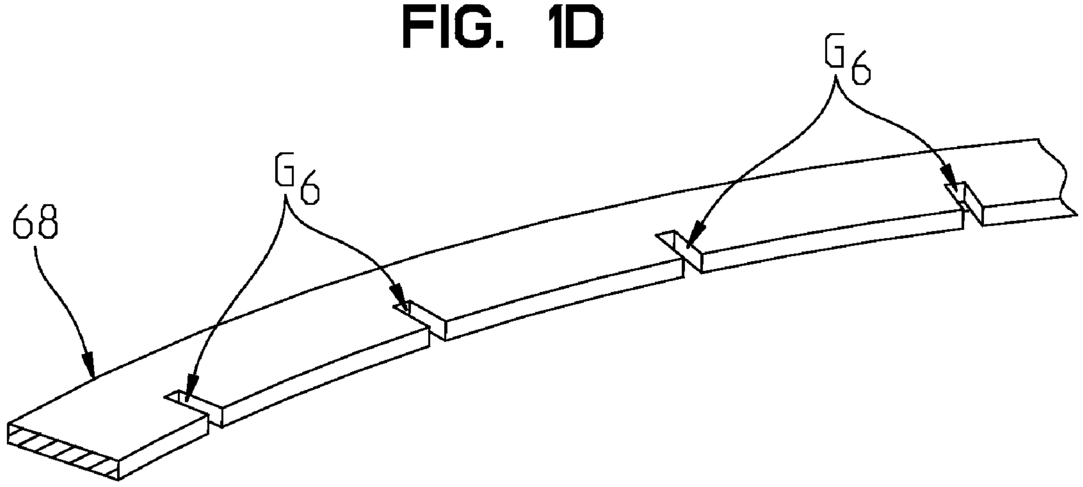
FIG. 1D is a partial perspective view of a seal member illustrated in FIG. 1.

It is noted that the first and second seal members 68, 70 may include an array of radially extending gaps $G_6$ (see the first seal member 68 illustrated in FIG. 1D) formed therein with circumferentially spaced fingers provided between the gaps $G_6$. The gaps $G_6$ and fingers provide for flexibility in the seal members 68, 70. The gaps $G_6$ may extend only a partial axial length of the first and second seal members 68, 70, as shown in FIG. 1D. In the embodiment illustrated in FIGS. 1, 1A, 1B, and 1D, the first and second seal members 68, 70 comprise a single row of fingers in the radial direction As stated above, the first seal member 68 seals the gaps $G_1$, $G_4$ formed between the first seal retainer plate structure 62 and the seal housing apparatus 66. Thus, the first seal member 68 substantially prevents hot combustion gases flowing in the hot gas flow path 26 from leaking into a first cavity 116 (see FIGS. 1 and 1A) formed between the first leg portion 86A of the seal housing apparatus 66 and the first seal retainer plate structure 62. The first seal member 68 also substantially prevents cooling air, which is typically located in the first cavity 116, i.e., that enters the first cavity 116 through the cooling fluid aperture 75 formed in the first seal retainer plate structure 62, from leaking into the hot gas flow path 26.

The cooling fluid is advantageously conveyed into the first cavity 116 for cooling purposes, i.e., to cool the components of the sealing apparatus 60. Further, the cooling fluid affects the pressure differential between the hot gas flow path 26 and the first cavity 116, i.e., raises the pressure within the first cavity 116 at least as high as the pressure within the hot gas flow path 26, such that leakage between the hot combustion gases from the hot gas flow path 26 and the cooling fluid in the first cavity 116, if any, is from the first cavity 116 into the hot gas flow path 26. The second seal member 70 similarly prevents leakage between the hot gas flow path 26 and a second cavity 118, see FIGS. 1 and 1B, which second cavity 118 is located between the second leg portion 86B of the seal housing apparatus 66 and the second seal retainer plate structure 64. It is noted that since the first and second cavities 116 and 118 are smaller in size than cavities included in prior art engines, a smaller amount of cooling fluid can be used in the first and second cavities 116 and 118 to achieve desired cooling and pressure advantages as compared to the amount of cooling fluid required to achieve desired cooling and pressure advantages in prior art engines with larger cavities.

Further, as discussed above, the seal teeth 106 and the sealing structure 40 of the inner diameter platform 38 create a reduced radial clearance between each vane 19 and the seal housing apparatus 66. Thus, the passage of hot combustion gases through each gap $G_3$ is reduced. However, an amount of cooling fluid flows from the cooling air pocket 45 through the bores 44A, 44B formed in the outer diameter portions 28 and the airfoils 20 and then exits the vanes 19 through the cooling air passages 46A, 46B formed in the inner diameter platform 38. This cooling fluid flows through the gap $G_3$ to provide cooling to the inner diameter platform 38 and the radially outer seal housing structure 82 of the seal housing apparatus 66. It is noted that cooling air flowing out of the cooling air passages 46A, 46B assists in preventing the hot combustion gases from flowing through the gap $G_3$, i.e., by pushing the hot combustion gases away from the gap $G_3$.

Figure 3:
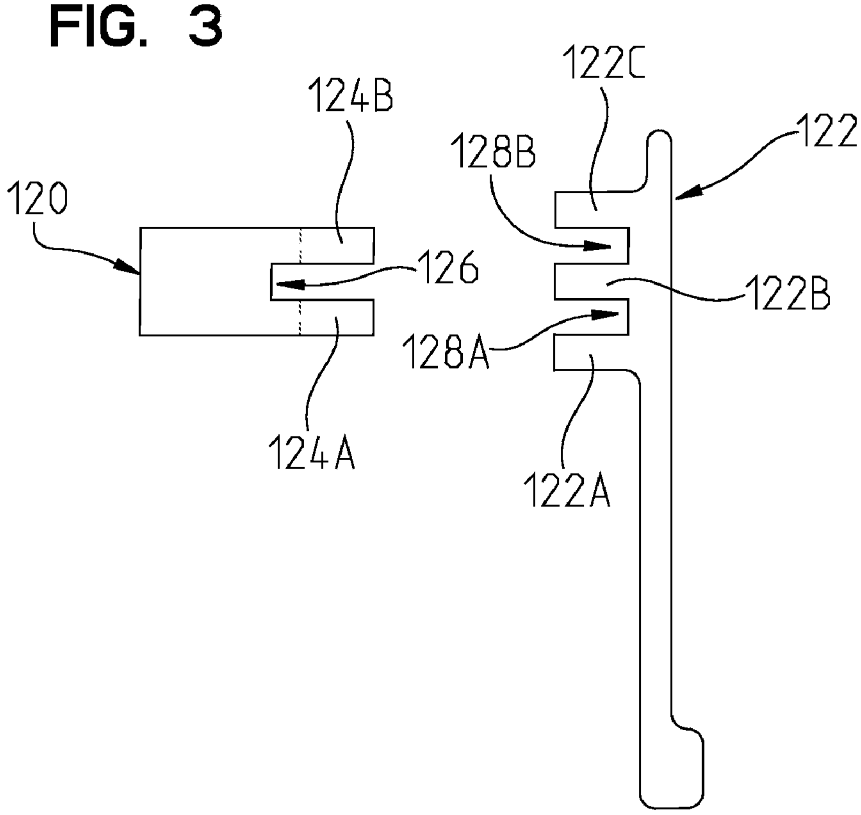
FIG. 3 is an exploded sectional view of a seal structure according to an embodiment of the invention.

Referring now to FIG. 3, a seal member 120 and an associated seal retainer plate 122 according to another embodiment of the invention are shown. The seal member 120 is also associated with a seal housing apparatus (not shown in this embodiment), and is adapted to replace the first and/or second seal member 68, 70 disclosed above for FIGS. 1, 1A, 1B, and 2.

Figure 3A:
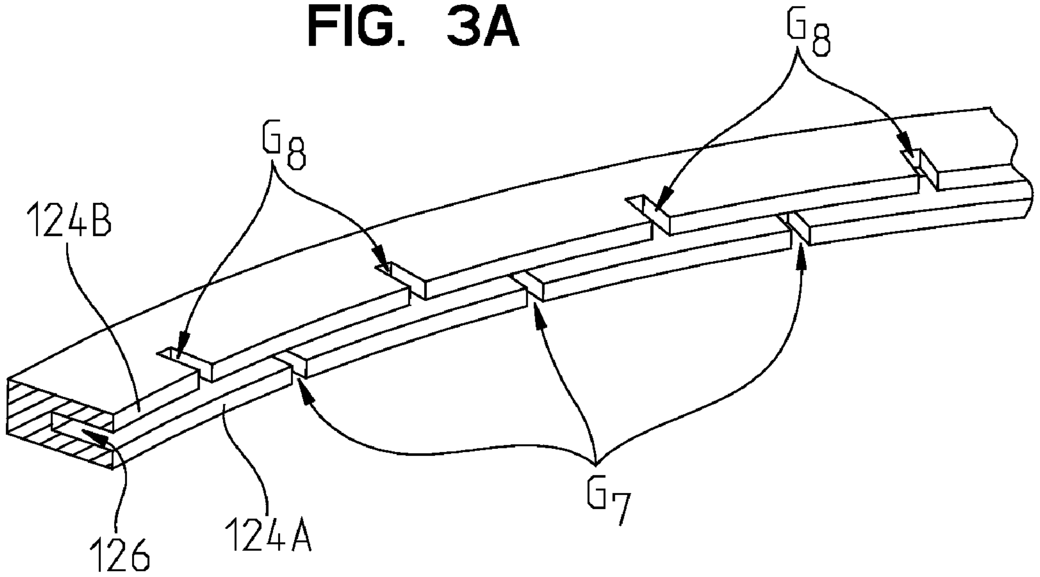
FIG. 3A is a partial perspective view of a component of the seal structure illustrated in FIG. 3.

In this embodiment, the seal member 120 comprises first and second rows of axially extending fingers 124A, 124B (see FIGS. 3 and 3A). The first and second rows of axially extending fingers 124A, 124B are radially spaced apart from each other such that a slot 126 is formed therebetween. As shown in FIG. 3A, first and second radially extending gaps $G_7$, $G_8$, respectively, may be formed in the seal member 120 to define the first and second rows of axially extending fingers 124A, 124B. The gaps $G_7$, $G_8$ may extend only a partial axial length of the seal member 120 as shown in FIG. 3A. The gaps $G_7$, $G_8$ illustrated in FIG. 3A are arranged in a staggered relationship, such that no gap $G_7$ located between adjacent axially extending fingers 124A is radially aligned with any gap $G_8$ located between adjacent axially extending fingers 124B. Thus, a seal provided by the seal member 120 is more efficient, i.e., fluid leakage around the seal member 120 is reduced as a direct radial path through the gaps $G_7$, $G_8$ is avoided. The gaps $G_7$, $G_8$ permit an amount of thermal expansion of the first and second rows of axially extending fingers 124A, 124B, i.e., as might be encountered during operation of a gas turbine engine in which the seal member 120 is disposed.

The seal retainer plate 122 in this embodiment includes a radially inner axially extending structure 122A, an intermediate axially extending structure 122B, and a radially outer axially extending structure 122C. When the seal retainer plate 122 and the seal member 120 are positioned within the engine, they are positioned such that the radially inner, intermediate, and radially outer axially extending structures 122A, 122B, 122C cooperate with the first and second rows of axially extending fingers 124A, 124B to provide a seal within the engine, i.e., between a hot gas flow path and a cavity (neither of which is shown in this embodiment). Specifically, the intermediate axially extending structure 122B is received within the slot 126 formed between the first and second rows of axially extending fingers 124A, 124B. Additionally, the first row of axially extending fingers 124A is received in a first slot 128A formed between the radially inner axially extending structure 122A and the intermediate axially extending structure 122B. Moreover, the second row of axially extending fingers 1248 is received in a second slot 128B formed between the intermediate axially extending structure 122B and the radially outer axially extending structure 122C.

Figure 4:
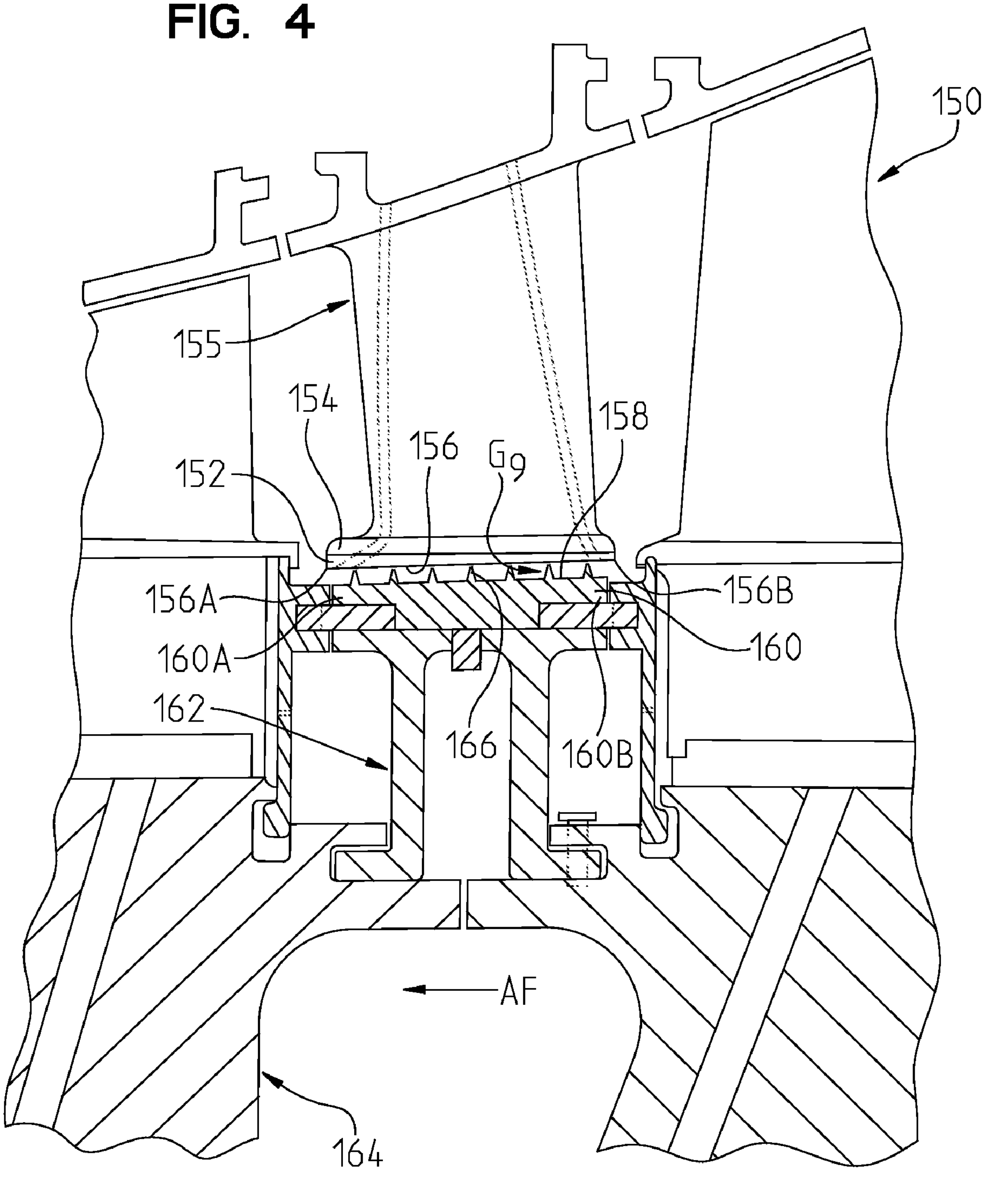
FIG. 4 is a diagrammatic sectional view of a portion of a gas turbine engine including a cavity seal assembly in accordance with another embodiment of the invention.

Referring now to FIG. 4, a portion of a turbine section of a gas turbine engine 150 according to another embodiment of the invention in shown. In this embodiment, a sealing structure 152 comprising part of an inner diameter platform 154 of a vane 155 is configured such that a radially inner surface 156 of the sealing structure 152 includes a curvature in a circumferential direction and is angled in an axial direction relative to horizontal. The sealing structure 152 according to this embodiment preferably comprises an abrasive layer formed for example from a combination of yttria and zirconia. As shown in FIG. 4, the radially inner surface 156 of the sealing structure 152 is sloped radially outwardly from a forward end 156A thereof to an aft end 156B thereof. Thus, a radial thickness of the sealing structure 152 at the forward end 156A thereof is greater than a radial thickness of the sealing structure 152 at the aft end 156B thereof.

A radially outer surface 158 of a radially outer seal housing structure 160 of a seal housing apparatus 162 is correspondingly shaped to the shape of the sealing structure 152, i.e., the radially outer surface 158 includes a curvature in the circumferential direction and is angled in the axial direction relative to horizontal. Hence, a radial dimension of a gap $G_9$ formed between the radially inner surface 156 of the sealing structure 152 and the radially outer surface 158 of the radially outer seal housing structure 160 remains substantially the same from a forward end portion 160A of the radially outer seal housing structure 160 to an aft end portion 160B of the radially outer seal housing structure 160.

During operation of the engine 150, it has been found that a disc/rotor assembly 164 to which the seal housing apparatus 162 is affixed tends to move slightly axially forward relative to the vanes 155 in the direction of arrow AF in FIG. 4. If this relative axial movement occurs, a radial slope of the gap $G_9$ facilitates a decrease in the radial distance between the radially inner surface 156 of the sealing structure 152 and the radially outer surface 158 of the radially outer seal housing structure 160, i.e., as the disc/rotor assembly 164 moves axially forward (to the left as shown in FIG. 4), the radially inner surface 156 of the sealing structure 152 becomes radially closer to the radially outer surface 158 of the radially outer seal housing structure 160. In this case, a radial clearance between radially inner surface 156 of the sealing structure 152 and seal teeth 166 of the radially outer seal housing structure 160 is reduced, thus providing an improved seal between the sealing structure 152 and the seal teeth 166. In some instances, the radially inner surface 156 of the sealing structure 152 may even come into contact with the seal teeth 166 of the radially outer seal housing structure 160.

Since the sealing structure 152 according to this embodiment preferably comprises an abradable surface, any contact between the seal teeth 166 and the sealing structure 152 may result in a deterioration of the abradable material of the sealing structure 152, wherein the seal teeth 166 remain substantially unharmed.

Figure 5:
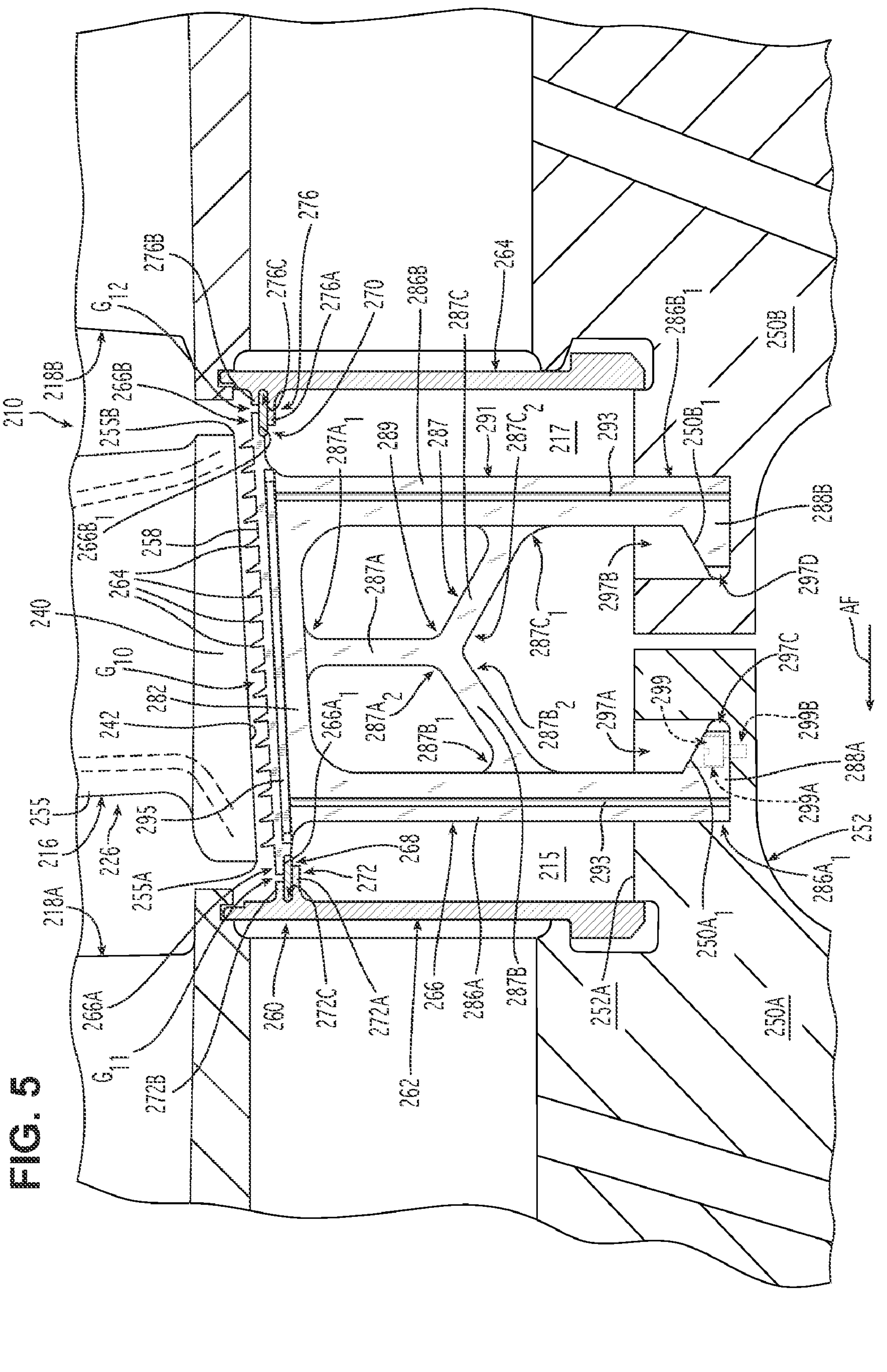
FIG. 5 is a diagrammatic sectional view of a portion of a gas turbine engine including a cavity seal assembly in accordance with yet another embodiment of the invention.

Referring now to FIG. 5, a sealing apparatus 260 in a turbine section of a gas turbine engine 210 according to yet another embodiment of the invention is shown. The sealing apparatus 260 is generally located radially inwardly from a row of stationary vanes 216, which row of vanes 216 is located between forward and aft rows of rotatable blades 218A, 218B. The row of stationary vanes 216 comprises a plurality of vanes 255 (one shown in FIG. 5). The forward and aft rows of rotatable blades 218A, 218B are coupled to and rotate with respective rotor discs 250A, 250B of a disc/rotor assembly 252 during operation of the engine 210. The sealing apparatus 260 substantially prevents leakage between a hot gas flow path 226 and first and second cavities 215, 217.

In this embodiment, each vane 255 of the row of vanes 216 includes first sealing structure 240 that defines a radially inner surface 242 of each of the vane 255. The first sealing structure 240 according to this embodiment preferably comprises an abradable layer or a honeycomb layer. The sealing structure 240 includes a curvature in a circumferential direction and is angled in an axial direction relative to horizontal, as shown in FIG. 5. Specifically, the radially inner surfaces 242 of the vanes 255 are sloped radially outwardly from a forward end 255A thereof to an aft end 255B thereof. Thus, a radial thickness of the first sealing structure 240 at the forward end 255A of each vane 255 is greater than a radial thickness of the first sealing structure 240 at the aft end 255B of each vane 255.

A radially outer surface 258 of a seal housing apparatus 266 is correspondingly shaped to the shape of the first sealing structure 240, i.e., the radially outer surface 258 includes a curvature in the circumferential direction and is angled in the axial direction relative to horizontal. Hence, a radial dimension of a tenth gap $G_{10}$ formed between the first sealing structure 240 and the radially outer surface 258 of the seal housing apparatus 266 remains substantially the same from a forward end portion 266A of the seal housing apparatus 266 to an aft end portion 266B of the seal housing apparatus 266. It is noted that the radially inner surfaces 242 of each of the vanes 255 and the radially outer surface 258 of the seal housing apparatus 266 need not be angled in the axial direction to practice this embodiment of the invention. These surfaces 242, 258 could extend substantially parallel to the axis of the engine 210 in the axial direction if desired.

As shown in FIG. 5, the seal housing apparatus 266 is coupled to the rotor discs 250A, 250B of the disc/rotor assembly 252 so as to be rotatable with the disc/rotor assembly 252 during operation of the engine 210. Additional details in connection with the coupling of the seal housing apparatus 266 to the disc/rotor assembly 252 will be discussed below.

The seal housing apparatus 266 in the embodiment shown comprises a base member 282, a first leg portion 286A, a second leg portion 286B, and a spanning structure 287.

The base member 282 comprises second sealing structure 264 that extends radially outwardly from the radially outer surface 258 of the seal housing apparatus 266. In the embodiment shown, the second sealing structure 264 comprises seal teeth that are adapted to come into close proximity to or engage with the first sealing structure 240 defining the radially inner surfaces 242 of the vanes 255. The second sealing structure 264 cooperates with the first sealing structure 240 to substantial prevent leakage through the gap tenth $G_{10}$ between the first sealing structure 240 and the radially outer surface 258 of the seal housing apparatus 262.

It is noted that the first and second sealing structures 240, 264 may be switched, wherein the vanes 255 would include the second sealing structure 264, e.g., the seal teeth, and the seal housing apparatus 266 would include the first sealing structure 240, e.g., the abradable layer or the honeycomb layer.

A first seal retainer plate structure 262 of the sealing apparatus 260, which seal retainer plate structure 262 may also be referred to a cover plate, a lock plate, or a disc sealing plate, is associated with the forward row of rotatable blades 218A. The first seal retainer plate structure 262 includes first axially extending seal structure 272 comprising first and second axially extending legs 272A and 272B, which define a first recess 272C therebetween, see FIG. 5.

A first seal member 268, such as a riffle seal or bellyband seal, is received and secured in the first recess 272C of the first seal retainer plate structure 262. The first seal member 268 in the embodiment shown extends generally axially from the first seal retainer plate structure 262 toward the seal housing apparatus 266, and abuts a radially inner surface 266$A_1$ of the forward end portion 266A of the seal housing apparatus 266, so as to seal an eleventh gap $G_{11}$ between the first seal retainer plate structure 262 and the seal housing apparatus 266.

A second seal retainer plate structure 264 of the sealing apparatus 260 which seal retainer plate structure 264 may also be referred to an a cover plate, a lock plate, or a disc sealing plate, is associated with the aft row of rotatable blades 2188. The second seal retainer plate structure 264 includes second axially extending seal structure 276 comprising third and fourth axially extending legs 276A and 276B, which define a second recess 276C therebetween, see FIG. 5.

A second seal member 270, such as a riffle seal or belly-band seal, is received and secured in the second recess 276C of the second seal retainer plate structure 264. The second seal member 270 in the embodiment shown extends generally axially from the second seal retainer plate structure 264 toward the seal housing apparatus 266, and abuts a radially inner surface 266$B_1$ of the aft end portion 266B of the seal housing apparatus 266 so as to seal a twelfth gap $G_{12}$ between the second seal retainer plate structure 264 and the seal housing apparatus 266.

The first leg portion 286A extends radially inwardly from the base member 282 and includes a foot member 288A at a radially inner portion 286$A_1$ thereof. The foot member 288A couples the first leg portion 286A to the rotor disc 250A of the disc/rotor assembly 252, as will be described below. In the embodiment shown, the foot member 288A of the first leg portion 286A extends generally axially toward the second leg portion 286B and is tapered in a radial direction for engagement with an angled surface 250$A_1$ of the rotor disc 250A of the disc/rotor assembly 252, as will be discussed below.

The second leg portion 286B is axially spaced from the first leg portion 286A and extends radially inwardly from the base member 282. The second leg portion 286B includes a foot member 288B at a radially inner portion 286$B_1$ thereof, which foot member 288B couples the second leg portion 286B to the rotor disc 250B of the disc/rotor assembly 252, as will be described below. In the embodiment shown, the foot member 288B of the second leg portion 286B extends generally axially toward the first leg portion 286A and is tapered in the radial direction for engagement with an angled surface 250$B_1$ of the rotor disc 250B of the disc/rotor assembly 252, as will be discussed below.

As shown in FIG. 5, the spanning structure 287 extends between and is rigidly coupled to each of the base member 282, the first leg portion 286A, and the second leg portion 286B. The spanning structure 287 comprises a first truss member 287A that extends radially inwardly from the base member 282, a second truss member 287B that extends axially and radially from the first leg portion 286A toward the second leg portion 286B and the base member 282, and a third truss member 287C that extends axially and radially from the second leg portion 286B toward the first leg portion 286A and the base member 282. Each of the truss members 287A, 287B, 287C includes a first end portion 287$A_1$, 287$B_1$, 287$C_1$ rigidly coupled to a respective one of the base member 282, the first leg portion 286A, and the second leg portion 286B. Each of the truss members 287A, 287B, 287C further includes a second end portion 287$A_2$, 287$B_2$, 287$C_2$, which second end portions 287$A_2$, 287$B_2$, 287$C_2$ are all rigidly coupled together at a knee junction 289.

Figure 6:
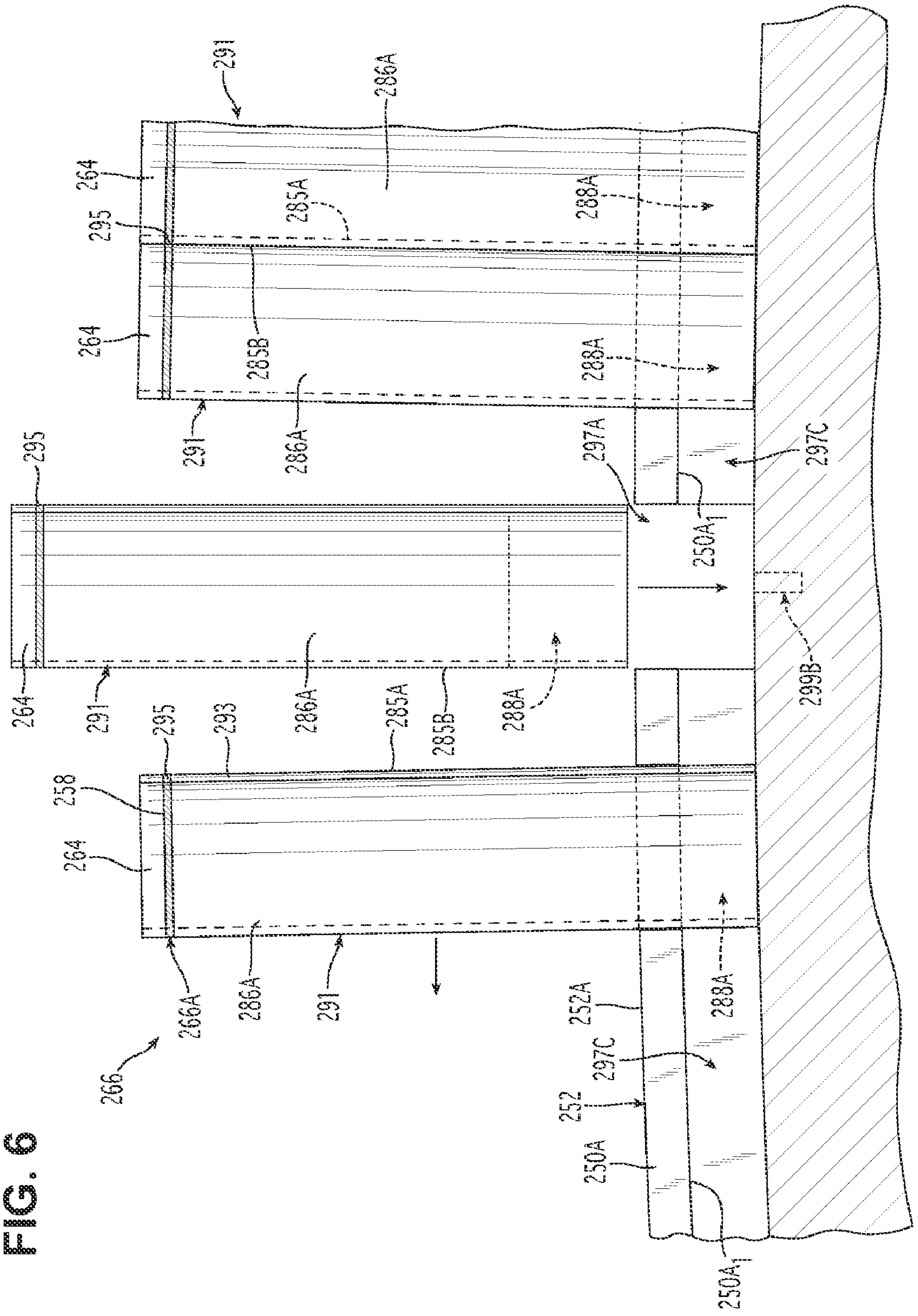
FIG. 6 is a cross sectional view illustrating the cavity seal assembly illustrated in FIG. 5 being assembled, wherein a portion of a disc assembly has been broken away for clarity.

Referring to FIG. 6, the seal housing apparatus 266 comprises a plurality of separate and circumferentially adjacent seal housing members 291. Each of the seal housing members 291 comprises its own base member 282, leg portions 286A, 286B, and spanning structure 287.

Seal structures 293, such as wire seals, rope seals, brush seals, etc., may extend radially between the first leg portions 286A of adjacent seal housing members 291 and between the second leg portions 286B of adjacent seal housing members 291 to prevent leakage therebetween. Additionally, adjacent seal housing members 291 may be arranged such that the leg portions 286A, 286B thereof are provided in a nested or shiplap configuration, as identified by edge elements at 285A and 285B in FIG. 6, to further reduce leakage therebetween. Moreover, seal elements 295, such as wire seals, rope seals, brush seals, etc., may extend axially between the base members 282 of adjacent seal housing members 291 to prevent leakage therebetween.

During installation of the seal housing apparatus 266, each of the seal housing members 291 is radially inserted through first and second radially facing slots 297A, 297B formed in the disc/rotor assembly 252, see FIGS. 5 and 6 (only the first slot 297A is illustrated in FIG. 6). Specifically, the foot member 288A of the first leg portion 286A is radially inserted through the first slot 297A, which is formed in the rotor disc 250A, and the foot member 288B of the second leg portion 286B is radially inserted through the second slot 297B, which is formed in the rotor disc 250B.

The seal housing member 291, including its leg portions 286A, 286B and foot members 288A, 288B, is then displaced circumferentially within circumferentially extending third and fourth slots 297C, 297D, which extend up to the first and second slots 297A, 297B, such that the foot members 288A, 288B are not circumferentially aligned with the first and second slots 297A, 297B. The third and fourth slots 297C, 297D extend radially outwardly to a radially outer surface 252A of the disc/rotor assembly 252, but are axially dimensioned such that the first and second leg portions 286A, 286B of each seal housing member 291 can extend therethrough. However, the third and fourth slots 297C, 297D are axially dimensioned such that the foot portions 288A, 288B of each of the seal housing members 291 cannot fit therethrough, i.e., cannot fit through in the radial direction. Rather, the foot portions 288A, 288B abut the angled surfaces 250$A_1$, 250$B_1$ of the rotor discs 250A, 250B, so as to secure the foot portions 288A, 288B within the third and fourth slots 297C, 297D to secure the seal housing members 291 to the disc/rotor assembly 252.

It is noted that, upon the radial insertion of the seal housing members 291 into the first and second slots 297A, 297B, the radially inner surfaces 266$A_1$ and 266$B_1$ of the forward and aft end portions 266A, 266B of the seal housing apparatus 266 are caused to abut the first and second seal members 268, 270, so as to seal the eleventh and twelfth gaps $G_{11}$, $G_{12}$.

Once all of the seal housing members 291 are arranged in their desired positions, a locking structure 299 is used to structurally secure the seal housing apparatus 266 within the third and fourth slots 297C, 297D of the disc/rotor assembly 252, i.e., to prevent the seal housing members 291 from rotating within the third and fourth slots 297C, 297D. In the embodiment shown, the locking structure 299 comprises a threaded screw or bolt, which is inserted through an aperture 299A in a last one of the seal housing members 291, which last one of the seal housing members 291 is illustrated in FIG. 5. The locking structure 299 is then is inserted into a corresponding threaded aperture 299B formed in the rotor disc 250A of the disc/rotor assembly 252 to secure the last one of the seal housing members 291 to the disc/rotor assembly 252, i.e., to prevent the last one of the seal housing members 291 from moving radially outwardly out of the first and second slots 297A, 297B. Since the last one of the seal housing members 291 is structurally secured to the disc/rotor assembly 252, all of the seal housing members 291 are prevented from rotating circumferentially within the third and fourth slots 297C, 297D. It is noted that the locking structure 299 may be installed through the base member 282 of the last one of the seal housing members 291 via a small hole (not shown), formed in the radially outer surface 258 of the last one of the seal housing members 291. Thereafter, the hole in the radially outer surface 258 of the last one of the seal housing members 291 is filled in to prevent leakage therethrough, and the row of vanes 216 is installed in a manner that will be apparent to those skilled in the art.

It is noted that, while only one pair of first and second slots 297A, 297B is shown in the disc/rotor assembly 252 in FIG. 5, the disc/rotor assembly 252 may include additional pairs of first and second slots 297A, 297B. In a preferred embodiment, the disc/rotor assembly 252 includes two pairs of first and second slots 297A, 297B, wherein the pairs of first and second slots 297A, 297B are spaced 180 degrees apart.

According to an embodiment of the invention, the seal housing apparatus 266 may be formed from the same material from which the forward and aft rows of rotatable blades 218A, 218B are formed, e.g., a cast nickel alloy such as INCONEL 738 (INCONEL is a registered trademark of Special Metals Corporation, located in New Hartford, N.Y.). Thus, the seal housing apparatus 266 is believed to be able to withstand higher temperatures, and therefore experiences longer service, than prior art seal apparatuses that are formed from forged nickel or iron alloys.

During operation of the engine 210, it has been found that the disc/rotor assembly 252 to which the seal housing apparatus 266 is affixed tends to move slightly axially forward relative to the vanes 255 in the direction of arrow AF in FIG. 5. If this relative axial movement occurs, a radial slope of the tenth gap $G_{10}$ facilitates a decrease in the radial distance between the radially inner surfaces 242 of the vanes 255 and the radially outer surface 258 of the seal housing apparatus 266, i.e., as the disc/rotor assembly 252 moves axially forward (to the left as shown in FIG. 5), the radially inner surfaces 242 of the vanes 255 become radially closer to the radially outer surface 258 of the seal housing apparatus 266. In this case, a radial clearance between the radially inner surfaces 242 of the vanes 255 and the seal teeth 264 is reduced, thus providing an improved seal between the vanes 255 and the seal teeth 264. In some instances, the inner surfaces 242 of the vanes 255 may even come into contact with the seal teeth 264. Since the first sealing structure 240 according to the preferred embodiment comprises an abradable layer or a honeycomb layer, any contact between the seal teeth 264 and the first sealing structure 240 may result in a deterioration of the abradable layer or honeycomb layer, wherein the seal teeth 264 remain substantially unharmed.

Further, the spanning structures 287 of the seal housing members 291 according to this embodiment effect to transfer centrifugal loads from the seal housing members 291 to the disc/rotor assembly 252. Specifically, the spanning structure 287 structurally ties the base member 282 and the first and second leg portions 286A, 286B of each seal housing member 291 together, so these components are believed to be substantially prevented from moving independently relative to each other. In particular, the spanning structure 287 substantially prevents the first and second leg portions 286A, 286B from spreading apart from each other when the seal housing member 291 is subjected to centrifugal loading. The structural rigidity of the seal housing member 291 provided by the spanning structure 287 effects to transfer centrifugal loads to the disc/rotor assembly 252 via the foot portions 288A, 288B of the respective leg portions 286A, 286B, so as to substantially prevent movement of the base member 282 and the first and second leg portions 286A, 286B. This is beneficial, since any movement of the base member 282 could result in disengagement of one or both of the end portions 266A, 266B of the seal housing apparatus 266 from the respective seal member 268, 270.

Moreover, the spanning structures 287 of the seal housing members 291 according to this embodiment effect to reduce the mass of the seal housing members 291, as compared to if the spanning members 291 comprised solid structures without the voided areas between the truss members 287A, 287B, 287C. The reduced mass of the seal housing members 291, and the seal housing apparatus 266 comprising the collective assembly of the seal housing members 291 effects to reduce the centrifugal load exerted on the disc/rotor assembly 252 from the seal housing members 291, so as to decrease stresses on the disc/rotor assembly 252.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Sealing apparatus in a gas turbine comprising forward and aft rows of rotatable blades coupled to a disc/rotor assembly and a row of stationary vanes positioned between the forward and aft rows of rotatable blades, the sealing apparatus comprising:

seal housing apparatus coupled to the disc/rotor assembly so as to be rotatable with the disc/rotor assembly during operation of the gas turbine, said seal housing apparatus comprising:

- a base member extending generally axially between the forward and aft rows of rotatable blades and positioned adjacent to the row of stationary vanes;
- a first leg portion extending radially inwardly from said base member, said first leg portion coupled to the disc/rotor assembly;
- a second leg portion axially spaced from said first leg portion, said second leg portion extending radially inwardly from said base member and being coupled to said disc/rotor assembly; and
- spanning structure extending between and rigidly coupled to each of said base member, said first leg portion, and said second leg portion, said spanning structure comprising first, second, and third truss members, each of said truss members including:
  - a first end portion rigidly coupled to a respective one of said base member, said first leg portion, and said second leg portion; and
  - a second end portion, said second end portion of each of said truss members rigidly coupled together.

2. The sealing apparatus as set out in claim 1, wherein:

said first truss member extends generally radially inwardly from said base member towards the disc/rotor assembly;

said second truss member extends axially from said first leg portion toward said second leg portion and joins said first truss member at a knee junction; and said third truss member extends axially from said second leg portion toward said first leg portion and is joined to said first and second truss members at said knee junction.

3. The sealing apparatus as set out in claim 2, wherein said second and third truss members extend radially outwardly from the respective first and second leg portions to said knee junction.

4. The sealing apparatus as set out in claim 1, further comprising:

a first seal retainer plate structure associated with the forward row of rotatable blades and having first axially extending seal structure;

a first seal member associated with said first axially extending seal structure and said seal housing apparatus so as to seal a gap between said first seal retainer plate structure and said seal housing apparatus;

a second seal retainer plate structure associated with the aft row of rotatable blades and having second axially extending seal structure; and a second seal member associated with said second axially extending seal structure and said seal housing apparatus so as to substantially prevent leakage through a gap between said second seal retainer plate structure and said seal housing apparatus.

5. The sealing apparatus as set out in claim 1, further comprising a first sealing structure coupled to one of the row of stationary vanes and said base member, said first sealing structure substantially preventing leakage through a gap between the row of stationary vanes and said base member.

6. The sealing apparatus as set out in claim 5, further comprising a second sealing structure coupled to the other of the row of stationary vanes and said base member, said second sealing structure cooperating with said first sealing structure to substantial prevent leakage through said gap between the row of stationary vanes and said base member.

7. The sealing apparatus as set out in claim 6, wherein said first sealing structure comprises one of an abradable layer and a honeycomb layer and said second sealing structure comprises labyrinth teeth.

8. The sealing apparatus as set out in claim 1, wherein said seal housing apparatus comprises a plurality of separate and circumferentially adjacent seal housing members and further comprising a seal structure between adjacent seal housing members.

9. The sealing apparatus as set out in claim 1, wherein said leg portions of said seal housing apparatus each includes a foot member, and wherein said foot member of each of said leg portion is:

radially inserted through a respective radially facing slot formed in the disc/rotor assembly; and circumferentially displaced so as to not be circumferentially aligned with said respective radially facing slot formed in the disc/rotor assembly.

10. Sealing apparatus in a gas turbine comprising forward and aft rows of rotatable blades coupled to a disc/rotor assembly and a row of stationary vanes positioned between the forward and aft rows of rotatable blades, the sealing apparatus comprising:

seal housing apparatus coupled to the disc/rotor assembly so as to be rotatable with the disc/rotor assembly during operation of the gas turbine, said seal housing apparatus comprising:

a base member extending generally axially between the forward and aft rows of rotatable blades and positioned adjacent to the row of stationary vanes;

a first leg portion extending radially inwardly from said base member, said first leg portion coupled to the disc/rotor assembly;

a second leg portion axially spaced from said first leg portion, said second leg portion extending radially inwardly from said base member and being coupled to said disc/rotor assembly;

spanning structure extending between and rigidly coupled to each of said base member, said first leg portion, and said second leg portion;

a first seal retainer plate structure associated with the forward row of rotatable blades and having first axially extending seal structure; and a first seal member associated with said first axially extending seal structure and said seal housing apparatus so as to seal a gap between said first seal retainer plate structure and said seal housing apparatus.

11. The sealing apparatus as set out in claim 10, further comprising:

a second seal retainer plate structure associated with the aft row of rotatable blades and having second axially extending seal structure; and a second seal member associated with said second axially extending seal structure and said seal housing apparatus so as to substantially prevent leakage through a gap between said second seal retainer plate structure and said seal housing apparatus.

12. The sealing apparatus as set out in claim 10, further comprising a first sealing structure coupled to one of the row of stationary vanes and said base member and a second sealing structure coupled to the other of the row of stationary vanes and said base member, said first and second sealing structures cooperating to substantial prevent leakage through a gap between the row of stationary vanes and said base member.

13. The sealing apparatus as set out in claim 10, wherein said spanning structure comprises first, second, and third truss members, each of said truss members including:

a first end portion rigidly coupled to a respective one of said base member, said first leg portion, and said second leg portion; and a second end portion, said second end portion of each of said truss members rigidly coupled together.

14. The sealing apparatus as set out in claim 10, wherein said seal housing apparatus comprises a plurality of separate and circumferentially adjacent seal housing members and further comprising a seal structure between adjacent seal housing members.

15. Sealing apparatus in a gas turbine comprising forward and aft rows of rotatable blades coupled to a disc/rotor assembly and a row of stationary vanes positioned between the forward and aft rows of rotatable blades, the sealing apparatus comprising:

seal housing apparatus coupled to the disc/rotor assembly so as to be rotatable with the disc/rotor assembly during operation of the gas turbine, said seal housing apparatus comprising:

a base member extending generally axially between the forward and aft rows of rotatable blades and positioned adjacent to the row of stationary vanes;

a first leg portion extending radially inwardly from said base member, said first leg portion coupled to the disc/rotor assembly;

a second leg portion axially spaced from said first leg portion, said second leg portion extending radially inwardly from said base member and being coupled to said disc/rotor assembly; and spanning structure extending between and rigidly coupled to each of said base member, said first leg portion, and said second leg portion;

wherein said leg portions of said seal housing apparatus each includes a foot member, and wherein said foot member of each of said leg portion is:

radially inserted through a respective radially facing slot formed in the disc/rotor assembly; and circumferentially displaced so as to not be circumferentially aligned with said respective radially facing slot formed in the disc/rotor assembly.

16. The sealing apparatus as set out in claim 15, wherein said foot member of said first leg portion extends axially toward said second leg portion, and said foot member of said second leg portion extends axially toward said first leg portion.

17. The sealing apparatus as set out in claim 15, wherein each said foot member is tapered in a radial direction for engagement with an angled surface of the disc/rotor assembly.

18. The sealing apparatus as set out in claim 15, wherein said sealing apparatus further comprises:

first seal retainer plate structure associated with the forward row of rotatable blades and having first axially extending seal structure;

second seal retainer plate structure associated with the aft row of rotatable blades and having second axially extending seal structure;

a first seal member associated with said first axially extending seal structure and said seal housing apparatus so as to seal a gap between said first seal retainer plate structure and said seal housing apparatus; and a second seal member associated with said second axially extending seal structure and said seal housing apparatus so as to seal a gap between said second seal retainer plate structure and said seal housing apparatus.

19. The sealing apparatus as set out in claim 15, further comprising a first sealing structure coupled to one of the row of stationary vanes and said base member and a second sealing structure coupled to the other of the row of stationary vanes and said base member, said first and second sealing structures cooperating to substantial prevent leakage through a gap between the row of stationary vanes and said base member.

20. The sealing apparatus as set out in claim 15, wherein said seal housing apparatus comprises a plurality of separate and circumferentially adjacent seal housing members and further comprising a seal structure between adjacent seal housing members.

* * * * *